US010981729B2

(12) United States Patent
Deuser

(10) Patent No.: US 10,981,729 B2
(45) Date of Patent: Apr. 20, 2021

(54) PALLET FOR A CONVEYOR SYSTEM, A CONVEYOR SYSTEM AND A METHOD FOR CONTROLLING SUCH A CONVEYOR SYSTEM

(71) Applicant: Flexlink AB, Goeteborg (SE)

(72) Inventor: Stefan Deuser, Obertshausen (DE)

(73) Assignee: Flexlink AB, Goeteborg (SE)

(*) Notice: Subject to any disclaimer, the term of this patent is extended or adjusted under 35 U.S.C. 154(b) by 0 days.

(21) Appl. No.: 16/621,725

(22) PCT Filed: Jun. 20, 2018

(86) PCT No.: PCT/SE2018/050672
§ 371 (c)(1),
(2) Date: Dec. 12, 2019

(87) PCT Pub. No.: WO2018/236283
PCT Pub. Date: Dec. 27, 2018

(65) Prior Publication Data
US 2020/0130945 A1 Apr. 30, 2020

(30) Foreign Application Priority Data
Jun. 23, 2017 (DE) ...................... 10 2017 113 953.2

(51) Int. Cl.
*B65G 35/06* (2006.01)
*B65G 21/22* (2006.01)
*B65G 17/00* (2006.01)

(52) U.S. Cl.
CPC ........... *B65G 35/06* (2013.01); *B65G 17/002* (2013.01); *B65G 21/22* (2013.01); *B65G 2203/0283* (2013.01)

(58) Field of Classification Search
CPC .................... B65G 35/06; B65G 21/22; B65G 2203/0283; B65G 21/20; B65G 17/34; B65G 17/002
See application file for complete search history.

(56) References Cited

U.S. PATENT DOCUMENTS 5,372,240 A * 12/1994 Weskamp ............ B65G 17/002
198/465.1
5,579,695 A * 12/1996 Cockayne ................ B23Q 1/28
104/106
(Continued)

FOREIGN PATENT DOCUMENTS

DE 19532281 A1 3/1997
DE 19540922 A1 5/1997
(Continued)

OTHER PUBLICATIONS

International Searching Authority, International Search Report and Written Opinion for International Application No. PCT/SE2018/050672, dated Sep. 12, 2018, (16 pages), Stockholm, Sweden.

Primary Examiner — Mark A Deuble
(74) Attorney, Agent, or Firm — Alston & Bird LLP

(57) ABSTRACT

Pallet for a conveyor system comprising a conveyor track, where the pallet comprises a housing having an upper side adapted to support an object, and an underside opposite to the upper side, where the underside is adapted to bear on a conveyor track, where the housing comprises a front side, a rear side, a right side and a left side, where the pallet comprises a rechargeable power source, a control unit, a wireless communication means and a plurality of actuating means arranged to be controlled by the control unit, where the actuating means are adapted to extend out of the housing or to retract into the housing by a control signal from the control unit. The advantage of the invention is that a self-contained pallet is provided, which can navigate through a conveyor system without the need of dedicated diverters.

15 Claims, 9 Drawing Sheets

(56) References Cited

U.S. PATENT DOCUMENTS

| | | | | |
|---|---|---|---|---|
| 7,219,793 | B2* | 5/2007 | Robertsson | B65G 17/002 |
| | | | | 104/26.2 |
| 8,322,516 | B2* | 12/2012 | Abbestam | B65G 17/32 |
| | | | | 198/465.1 |
| 9,553,830 | B2* | 1/2017 | Odell | H04L 65/1096 |
| 2002/0179410 | A1* | 12/2002 | Prodel | B65G 35/06 |
| | | | | 198/465.2 |
| 2007/0017779 | A1* | 1/2007 | Skljarow | B65G 35/06 |
| | | | | 198/367.1 |
| 2009/0178899 | A1 | 7/2009 | Krups et al. | |
| 2010/0200372 | A1 | 8/2010 | Krups et al. | |
| 2011/0240443 | A1* | 10/2011 | Ecob | B65G 17/00 |
| | | | | 198/793 |
| 2013/0126307 | A1* | 5/2013 | Stoeckle | B65G 21/2018 |
| | | | | 198/619 |
| 2015/0355211 | A1 | 12/2015 | Mellars et al. | |
| 2018/0362260 | A1* | 12/2018 | Hsiao | B65G 15/12 |

FOREIGN PATENT DOCUMENTS

| | | |
|---|---|---|
| DE | 19842752 A1 | 4/2000 |
| EP | 0527689 A1 | 2/1993 |
| EP | 0860383 A1 | 8/1998 |

* cited by examiner

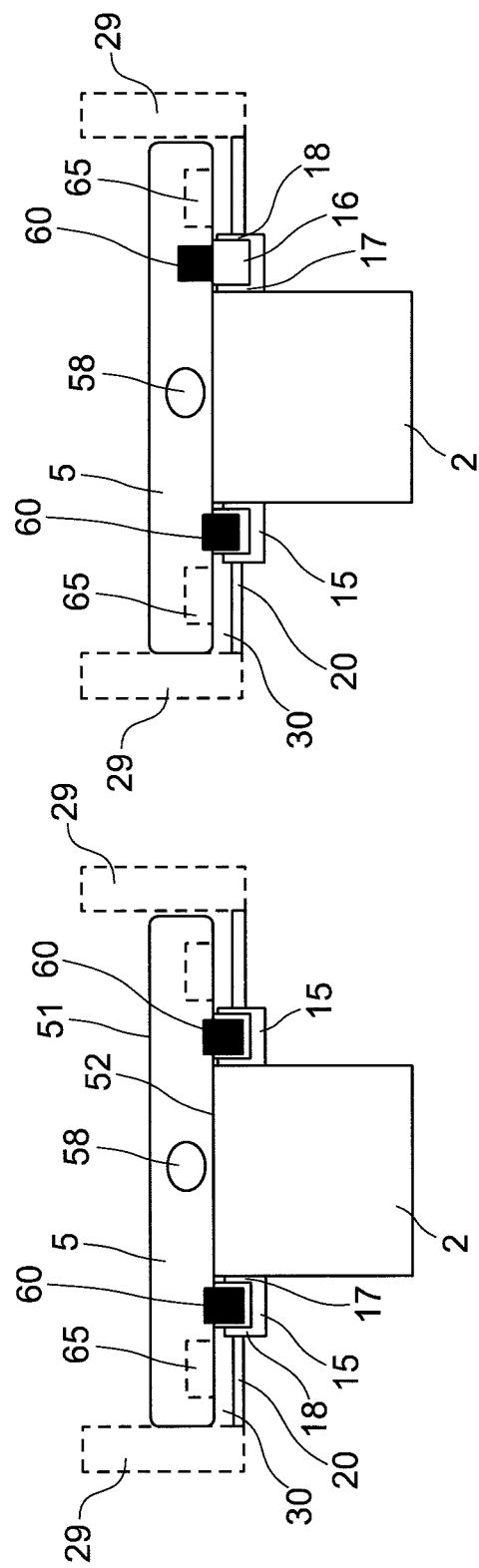

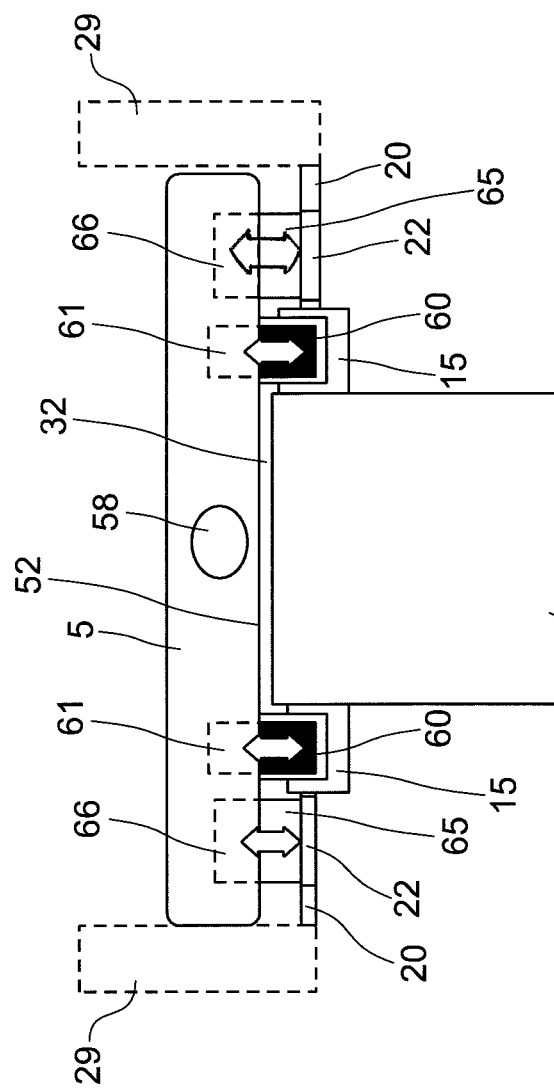

US 10,981,729 B2

PALLET FOR A CONVEYOR SYSTEM, A CONVEYOR SYSTEM AND A METHOD FOR CONTROLLING SUCH A CONVEYOR SYSTEM

CROSS REFERENCE TO RELATED APPLICATIONS

This application is a National Stage Application, filed under 35 U.S.C. § 371, of International Application No. PCT/SE2018/050672, filed Jun. 20, 2018, which claims priority to German Application No. 10 2017 113 953.2, filed Jun. 23, 2017; the contents of both of which are hereby incorporated by reference in their entirety.

BACKGROUND

Related Field

The present invention relates to a pallet that is designed to navigate independently or autonomously in a conveyor system from a starting point to a destination point. The present invention additionally relates to a conveyor system comprising such pallets and a control method for controlling such pallets, including a computer program product for executing such a control method.

Background Art

DESCRIPTION OF RELATED ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets.

A pallet is conveyed along the conveying device, which comprises different work stations. At a work station, the pallet will be stopped by a stop member such that the operation may be performed on the transported object. In some cases, the object may pass a specific work station without an operation being performed on the object. The stop member may for this reason be arranged to either stop the pallet or to let the pallet pass the work station.

If the conveying device is of a conventional type, in which all work stations are positioned after each other and the operations on the objects are performed synchronous, every pallet will stop at each work station. If no operation is to be performed on an object at a specific work station, the object will have to wait until the operation on the previous object at that work station is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects. Thus, such systems are mostly used for a single product or when the differences in the products are small.

In other systems, the operations on the objects are performed asynchronous, i.e. the pallet stops at a work station where an operation is to be performed, and is released when the operation is ready. In such systems, a queue comprising a number of pallets may thus be required at at least a few of the work stations in order to compensate for the different through-flow times of the products and for the different operation times at a work station.

In a normal pallet or puck queue, the pallets or pucks are allowed to bump into each other when they reach the end of the queue. A pallet or puck may be provided with a damper or resilient member in order to minimize the forces acting on the pallet or puck when they are stopped. This technology is used on pallets or pucks that convey somewhat heavier objects. For light objects, no additional damping is required.

To achieve a high conveying speed, a reliable and mechanically stable guidance of the pallets is necessary, which may be ensured via correspondingly designed carrier rails and guide rails having a suitable interaction with the pallets. In order for the material to be conveyed in a flexible manner in such a conveyor system from a starting point to different destinations, deviations of the pallets are required by deflectors and baffles to divert the pallets in a different conveying directions.

To be able to convey objects in a flexible manner, pallets that are conveyed by endlessly circulating conveyor chains or belts are used, where the pallets do not have their own driving mechanism. The pallets are loaded and directed to the respective destination where they are unloaded.

In order to route the pallets to the desired locations in the conveyor system, what are known as active diverters and stoppers are installed on the conveyor track. These elements must be individually installed and wired. Moreover, they must be controlled via a superordinate control technique, which is costly. Layout changes thereby require a significant mechanical, electrical, and technical programming expenditure. A conveyor system based upon this technology is thus not scalable in an easy way.

If the pallets jam in front of a stopper or a deflector, they cause a back pressure, depending upon the jam length, that acts on the pallets and the stoppers. Moreover, upon jamming, the pallets cause a jamming momentum that has a disadvantageous effect on the pallets and the product located thereon.

There thus exists a need for additional improvement in the aforementioned conveyor systems.

Brief Summary

An object of the invention is therefore to provide an improved pallet for a conveyor system. Another object of the invention is to provide a conveyor system comprising such a pallet. A further object of the invention is to provide a method for conveying objects in a conveyor system.

The solution to the problem according to the invention is a pallet (5) comprising a rechargeable power source (54), a control unit (56), a wireless communication means (57) and a plurality of actuating means (60; 65) arranged to be controlled by the control unit (56), where the actuating means (60; 65) are adapted to extend out of the housing (50) or to retract into the housing (50) by a control signal from the control unit (56). A further solution to the problem according to the invention is a conveyor system (1) adapted to convey pallets (5), comprising a plurality of conveyor tracks (2, 3) each comprising a conveying element (10), characterized in that the conveyor system (1) comprises at least one pallet (5). A further solution to the problem according to the invention is a method for transporting material to be conveyed from a starting point to a destination point by means of the aforementioned pallets and in a conveyor system having a plurality of conveyor tracks for conveying the pallets, where the conveyor system comprises lateral guides arranged along opposite sides of a conveyor track, and comprising the following steps: providing information on the topography of the conveyor system to a control unit of a pallet; providing marking or position data for the pallets in the conveyor system, wherein a respective transport path for transporting material to be conveyed from the respective starting point to the respective destination point is calculated for the pallets as a function of the topography of the conveyor system and/or an operating load of the conveyor system, the calculation of the respective transport path is respectively performed by the pallets, or the calculation of the respective transport path is performed by a central control unit of the conveyor system, and the calculated transport paths are transmitted to the respective pallets, and the guidance means and/or lifting devices of the pallets are adjusted in a time-dependent manner according to the respectively calculated transport path.

In a pallet for a conveyor system comprising a conveyor track, where the pallet comprises a housing having an upper side adapted to support an object, and an underside opposite of the upper side, where the underside is adapted to bear on a conveyor track where the housing comprises a front side, a rear side, a right side and a left side, the object of the invention is achieved in that the pallet comprises a rechargeable power source, a control unit, a wireless communication means and a plurality of actuating means arranged to be controlled by the control unit, where the mechanical actuating means are adapted to extend out of the housing or to retract into the housing by a control signal from the control unit.

By this first embodiment of the pallet according to the invention, a pallet that can navigate in a self-contained manner in a conveyor system is provided. With such a pallet, the pallet can divert to different conveyor tracks without the need of external diverter means. The pallet can further stop at predefined positions in the conveyor system without the need of external stopping means. A flexible conveyor system is in this way provided, which can be expanded or rearranged without the need of rebuilding the control system of the conveyor system. No new cables must be connected or replaced, and no diverter means or stopping means must be installed or moved when the conveyor system is adapted for a new use or new products.

The term conveyor track is to be understood as the respective transport path in the conveyor system. Each conveyor track is provided with lateral guides on one or both sides of the conveyor chain. The respective lateral guide is thereby provided, at least along segments of the conveyor track, with directional change of the pallet at diverters in which a driven conveyer element does not necessarily need to be provided. It may thereby be sufficient to provide a lateral guide only at one side at segments of the conveyor track having directional change. Via the engagement of guidance means in at least one of the lateral guides in a diverter section in the transport system, the direction of movement of the pallet may be changed in a simple manner, because a direction of movement for the pallet is pre-specified via the engagement of the guidance means in the respective lateral guide.

No complicated installations or control technology are required for this, because the intelligence and hardware for changing the direction of movement may be relocated entirely, or at least in significant parts, into the pallet itself. For this, a control unit is preferably provided in the pallet, which control unit suitably controls the guidance means in order to provide a direction change without an external controller, e.g. a central wired control unit of the conveyor system, and external mechanical elements such as mechanical diverters being needed for this. According to preferred embodiments of the invention, a pallet may thus autonomously navigate through the conveyor system from a starting point to a destination point.

A pallet is provided with an upper side for supporting the object to be conveyed and an underside that is situated opposite the upper side. The pallet is further provided with a front side, a rear side, a right side and a left side when seen in the direction of movement of the pallet. The pallet is provided with actuating means, which may be guidance means and/or lifting means. The lifting devices are adjustable in order to autonomously raise the pallet so that the underside of said pallet is released from the driven conveyor chain, such that the pallet is no longer conveyed by the driven conveyor chain.

A conveyor track may further comprise, at least in some segments, support surfaces on which the lifting devices may be temporarily supported for raising of the pallet. The pallet may further have guidance means that interact with the respective lateral guide of the conveyor system. The lifting devices are preferably arranged outside of a guide region of these guidance means, wherein the term "guide region" is the region of an actual interaction of the guidance means with these lateral guides.

Via the temporary raising and supporting of the pallet on the support surfaces, e.g. in the region of diverters or branches or jam-prone segments in the conveyor system, the movement of the pallet may be temporarily interrupted in a simple manner, e.g., in order to avoid a collision of the pallet with another pallet in the event of a jam, or in order to avoid a disruption in the conveyor system. In the raised state, however, the pallet may, also, simply be loaded with an object to be conveyed.

No complicated installations or control technology is required to control the raising and re-lowering of the pallet, because the intelligence required for controlling this may be relocated entirely, or at least in significant parts, into the pallet itself. For this, a control unit is preferably provided in the pallet, which control unit suitably controls the guidance means in order to produce a direction change, without an external controller such as a central control unit of the conveyor system, and external mechanical elements such as diverters being needed for this. According to preferred embodiments of the invention, a pallet may thus autonomously navigate through the conveyor system from a starting point to a destination point.

The pallet is conveyed in the conveyor system via simple placement of the underside on the upper side of the driven conveying element, for which a simple friction fit between the underside of the pallet and the upper side of the driven conveying element is preferred. For this, the conveying element preferably has a flat upper side with a suitable coefficient of friction. For this, the conveying element may be designed as a simple transport belt, as a belt conveyor or as a chain conveyor. The conveying element is thereby designed as a continuously circulating conveying element, e.g. as a circulating transport belt or as a circulating conveyor chain. In the region of diverters, branches, or the like, likewise, no conveying element may be provided, because, in these regions, it is sufficient for a direction change if the pallet traverses these regions with sufficient momentum, or if it is ensured by a geometric design of these regions that a rear end of the pallet is still driven by the conveying element of the conveyor system before or upstream of the region of a direction change, and a leading end of the pallet is still driven by the conveying element of the conveyor system after or downstream of the region of a direction change. The pallet may naturally also be driven in the manner of a pusher via positive fit, e.g. with projections on the upper side of the conveying element.

According to a further embodiment, the guidance means comprise at least two pairs of guidance means, wherein a first pair of guidance means is arranged near to a front side of the pallet, and a second pair of guidance means is arranged near a rear side of the pallet. The guidance means arranged on one side of the pallet can thereby be adjusted together, and the guidance means arranged on an opposite, second side of the pallet can thereby be adjusted together, in order to selectively be brought into or out of engagement with the respective lateral guide on the first or second side of the conveyor system. In this way, an engagement in a lateral guide on the left or right side of the conveyor track may be realised simply in order to induce a direction change to the left or right in a region of a segment with direction change.

It may thereby also be provided that, in a normal transport mode, the guidance means be extended on both sides of the pallet, in order to permanently engage in lateral guides that are provided on opposite sides of the conveyor track, whereby an even more reliable lateral guidance may be realised. The lateral guide may thereby in principle be formed directly by lateral edges of the conveyor track, e.g. directly by the lateral edges of a continuous profile in which the driven conveying element is guided, at least in the region of conveyor segments of the conveyor system that extend in a straight line. In principle, however, the lateral guides may also be designed as a gap that is bordered by vertical edge surfaces, e.g., by a vertical edge surface of a support profile of the conveyor track and a vertical edge surface of a lateral support surface, or by positive or negative mould closure formations, in particular vertical projections or recesses, that run laterally along the respective conveyor track.

According to a further embodiment, the guidance means are respectively designed as pairs of guide rollers that project from the underside of the pallet and are adjustable perpendicular to said underside of the pallet, with which friction losses in the lateral guides of the segments with direction change can advantageously be minimised. Naturally, other projecting formations (male positive fit elements) for lateral guidance of the pallet may also be provided that may engage in the corresponding lateral guides designed for these. Or, the lateral guides are conversely designed as projecting formations (male positive fit elements) that may interact with concave and adjustable formations or recesses (female positive fit elements) designed to correspond to these on the underside of the pallet.

According to a further embodiment, the respective lateral guide may respectively have a clearance, at least in segments of the conveyor system with direction change, which clearance extends parallel to the conveyor track and has a profile that is designed to correspond to the profile of the guidance means, and preferably is designed as a U-shaped profile, whereby a positive fit for guiding the pallet may be reliably realised via engagement of the guidance means in the lateral guide(s).

According to a further embodiment, lifting devices are furthermore provided that are arranged outside of a guide region of the guidance means and that are adjustable in order to autonomously raise the pallet so that the underside of said pallet is released from the driven conveying element, and the pallet is no longer conveyed further by the driven conveying element. In this way, it may be reliably prevented that the pallet runs into jams or disruption-prone regions, whereby damage to the pallet, and also to the object to be conveyed, may be reliably avoided.

According to a further embodiment, the lifting devices are designed as lifting devices that can be adjusted vertically relative to the underside of the pallet, which lifting devices thus project, in the extended state, from the underside of the pallet so that these are supported on support surfaces provided by the conveyor track, and the underside of the pallet is released from the driven conveying element, and, in a retracted state, enable a direct placement of the underside of the pallet on the driven conveying element. The lifting devices may be designed as cylindrical, rod-shaped, or cuboid structures that are axially adjustable or are borne so as to be pivotable, in order to sufficiently raise the pallet vertically via suitable displacement in order to release the friction fit of the underside of the pallet with the conveying element, and to provide a support on the support surfaces. For this purpose, the support surfaces are respectively arranged laterally relative to the conveyor track or the conveying element. In principle, however, other arrangements are also conceivable, e.g., with a conveying element formed in two cables, with two conveyor cables travelling in parallel and separated from one another, centrally, between the two conveyor cables.

According to a further embodiment, a maximum displacement travel of the lifting devices between the retracted state and the extended state of the lifting devices is smaller than a height of the guidance means perpendicular to the underside of the pallet is smaller than an extension depth of the guidance means into guide profiles of the respective lateral guide, such that an engagement of the guidance means in the respective lateral guide, and thus a reliable guidance of the pallet, may be ensured in every position of the lifting device. In particular, a lateral slippage of the pallet from the conveying element may thus be reliably prevented.

According to a further embodiment, the pallet furthermore comprises a control unit that is designed in order to control a displacement of the guidance means and/or lifting devices. This control unit enables, to the greatest possible extent, an autonomous navigation of the pallet in the conveyor system, and may advantageously be used for additional functions, as listed in the following. For this, the pallet comprises an electrical power source, preferably in the form of a rechargeable battery.

According to a further embodiment, the pallet furthermore comprises a distance sensor for detecting obstacles in the conveyor system in front of the pallet, wherein the control unit is designed to determine a distance to a detected obstacle on the basis of an output signal of the distance sensor and to jointly actuate the lifting devices if the distance so determined falls below a pre-specified threshold. In principle, especially distance sensors operating without contact, such as optical sensors, ultrasound sensors, or RF sensors, are suitable as a distance sensor. In addition or alternatively, a distance sensor may also be provided at the rear side of the pallet in order to detect obstacles in the conveyor system behind said pallet, wherein the information of the distance sensor or a signal derived therefrom may be provided to other pallets in the conveyor system via data exchange in order to warn of jams and other hazardous situations, e.g. obstacles on the respective conveyor track.

According to a further embodiment, the pallet furthermore comprises a detection device for detecting position indicating marking or position data in the conveyor system, wherein the control unit is designed to determine a position of the pallet in the conveyor system on the basis of the detected position indicating marking or position data. For example, this position information may be evaluated by the aforementioned control unit and may be transmitted via data exchange to a central control device of the conveyor system and/or other pallets. In particular, this position information may be used in order to promptly move the guidance means and/or lifting devices of the pallet, for example in order to produce a direction change or a stop of the pallet.

According to a further embodiment, as a function of the determined position information, the aforementioned control unit is designed to jointly move the guidance means arranged on a first side of the pallet and the guidance means arranged on an opposite second side of the pallet as a function of the position so determined, in order to selectively bring these into or out of engagement with the lateral guide on the first or second side of the conveyor system in order to produce a desired direction change.

According to a further embodiment, the pallet furthermore comprises a wireless communication device that is connected to the control unit and is designed to exchange data with a central control unit of the conveyor system, or with control units of additional pallets that are conveyed in the conveyor system. In this way, at any point in time, precise and complete information may be provided about the position and additional important parameters of all pallets in the conveyor system, which may be used for more intelligent control of the pallets, and also for additional elements.

According to a further embodiment, the pallet furthermore comprises a storage device for storing information regarding the topography of the conveyor system, wherein the control unit is furthermore designed in order to calculate a transport path for transporting objects to be conveyed from a starting point to a destination point as a function of the topography of the conveyor system and/or an operational utilisation of the conveyor system and/or additional parameters. The storage device is preferably integrated in the control unit. The information regarding the topography of the conveyor system thereby contains complete information regarding a more precise route guidance in the entire conveyor system, including branches, diverters, stop segments, turnout segments, segments for merging different conveyor tracks together again, slope segments, and the like, and thus information by which a transport path may respectively be calculated from a starting point to a desired destination point in the conveyor system. This transport path may be optimised, e.g. minimised with regard to the required transport time or the route length.

According to a further embodiment, in the event of a jam in the conveyor system, as detected by the aforementioned distance sensors or communicated by the respective control unit, said control unit is furthermore designed in order to calculate an alternative transport path for transporting objects to be conveyed from the starting point to the destination point, which alternative transport path circumnavigates the jam or otherwise hazardous segments in the conveyor system, whereby damage to the pallet, and also to the object to be conveyed, may be reliably avoided.

According to a further aspect of the present invention, a conveyor system for transporting objects to be conveyed by means of pallets is provided, having a plurality of conveyor tracks with a continuously-driven conveying element for conveying the pallets, with which are associated two lateral guide rails that are arranged laterally, at least in segments, along a respective conveyor track, on two opposite sides of said conveyor track. According to the invention, the pallets are designed as stated above.

According to a further aspect of the present invention, a conveyor system for transporting objects to be conveyed by means of pallets is provided, with a plurality of conveyor tracks having a continuously-driven conveying element for conveying the pallets, wherein the pallet has an upper side for supporting the object to be conveyed and an underside that is situated opposite the upper side. According to the invention, the pallets have lifting devices that are adjustable in order to autonomously raise the pallets so that the underside of said pallet is released from the driven conveying element, and the pallet is no longer conveyed further by the driven conveying element.

According to a further embodiment, the respective lateral guide and lateral support surfaces provided by the conveyor tracks do not project beyond the upper sides of the driven conveying element. Not only can a small installation height thereby be achieved, but also a relatively small adjustment travel of the guidance means and lifting devices, which helps to reduce the cost of actuators that are required for this.

According to a further aspect of the present invention, a method is provided for transporting material to be conveyed from a starting point to a destination point by means of pallets as disclosed herein, in a conveyor system as disclosed herein. In the method, information regarding the topography of the conveyor system is provided, which the control unit of the pallet, or also a central control unit of the conveyor system, may use to calculate respective transport paths of the pallets in the conveyor system. Furthermore, the method includes the provision of position indicating marking or position data for the pallets in the conveyor system, from which the respective current positions, and also control commands for moving the guidance means and/or lifting devices of the pallets can be calculated in a simply manner. In the method, a respective transport path for transporting material to be conveyed from the respective starting point to the respective destination point is calculated for the pallets as a function of the topography of the conveyor system and/or an operational utilisation of the conveyor system, wherein the calculation of the respective transport path is respectively performed directly by the pallets by means of their control units, or the calculation of the respective transport path is performed by a central control unit of the conveyor system, and the calculated transport paths are transmitted to the respective pallets. Ultimately, in the method, the guidance means and/or lifting devices of the pallets are moved in a time-dependent manner, corresponding to the respective calculated transport path, so that the pallets may autonomously navigate through the conveyor system along the respective calculated transport path.

According to a further aspect of the present invention, a corresponding method is provided for controlling pallets for transporting material to be conveyed from a starting point to a destination in a conveyor system, wherein the control of the pallets takes place so that the aforementioned method for transporting material to be conveyed from the starting point to the desired destination point may be performed by means of pallets.

According to a further aspect of the present invention, a computer program product for controlling a pallet for transporting material to be conveyed from a starting point to a destination point in a conveyor system, with which computer program product the aforementioned method for controlling pallets for transporting material to be conveyed from the starting point to the destination point in the conveyor system may be implemented.

BRIEF DESCRIPTION OF THE FIGURES

The invention will be described in greater detail in the following, with reference to the embodiments that are shown in the attached drawings, in which FIG. 3a-3d show in schematic section views the pallet according to the invention in various operating states, FIG. 3e shows the movement possibilities of the pallet according to the invention.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left etc. refer to directions of a conveyor and a pallet in normal use.

Figure 1:
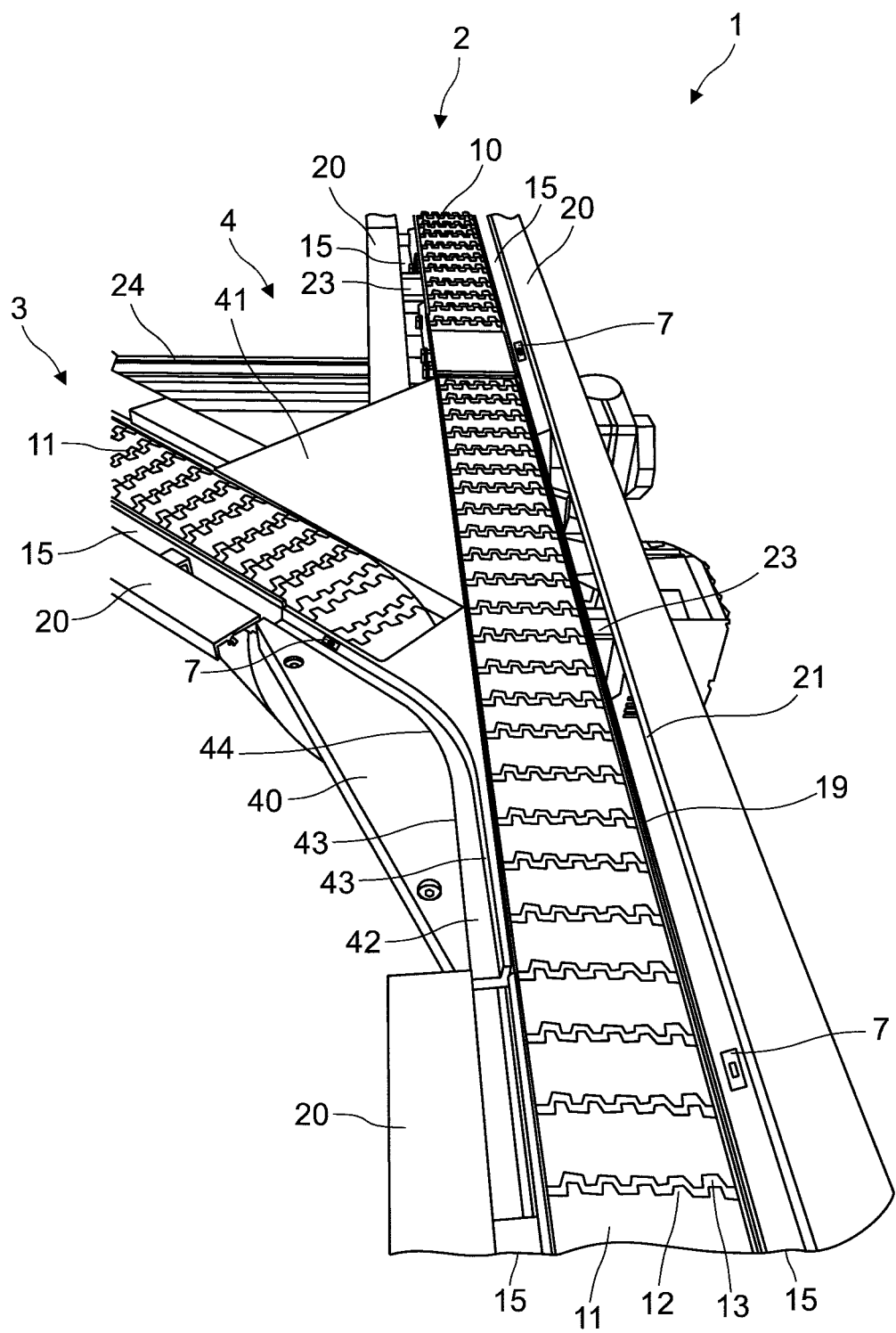
FIG. 1 shows in a schematic perspectival view a conveyor system according to the invention.

FIG. 1 shows a detail section of a conveyor system 1 according to the present invention. The conveyor system 1 is composed of a plurality of segments having conveyor tracks 2, 3 that are connected to one another via diverter sections 4. In particular, the conveyor system 1 is composed of a plurality of segments that extend in straight lines, are curved in arcs, or are also inclined vertically. Pallets are conveyed on the conveyor tracks 2, 3 which are here shown as linear segments along transport paths that are established exclusively by the course of the respective conveyor tracks 2, 3, where the pallets may be diverted in a different direction by diverter sections 4 and be conveyed on another conveyor track, and then in turn be conveyed by this along transport paths that are established exclusively by the course of the other conveyor tracks. Individual segments are thus divided up via a diverter section 4 into two segments that extend in different directions downstream of a diverter section 4. Such diverter sections 4 may also be used in order to merge two segments again into one segment.

The conveyor system 1 will thus normally comprise a plurality of diverter sections 4 for dividing and re-merging individual segments, which enables a suitable flexibility in conveying pallets. In particular, the diverter sections 4 may be arranged to be distributed in the conveyor system 1 such that there may be multiple different transport paths along which a respective pallet may be conveyed from a predetermined starting point or source to a predetermined destination point or target. In the event of a jam or a temporary overload in a segment of the conveyor system, a pallet may thus be flexibly conveyed along alternative transport paths, as presented in detail in the following, so that jams in the conveyor system may be avoided.

Each of the conveyor tracks 2, 3 has a continuously driven conveying element 10, here shown as a conveyor chain, that is driven continuously by means of a driving mechanism (not shown). In particular, the conveying element may be directed in continuous circulation and preferably has a flat surface on which the pallet lie loosely for transport, in order to be carried along passively by the respective conveying element 10, due to friction fit. Suitable conveyor belts or conveyor chains may be used as conveying elements 10. On the upper side of the conveying elements 10, pusher structures may also be formed, e.g., in the form of projections extending transversely to the conveying direction, in order to prevent a slippage of the pallets on the conveying element 10. Conveying segments travelling at an angle upwards or downwards with considerable incline can thereby even be realised in the conveyor system, without additional measures.

The exemplary embodiment according to FIG. 1 forms the basis of a conveyor system 1 in which the conveying elements 10 are designed as conveyor tracks with a continuously-circulating conveyor chain, preferably made of a plastic material. The conveyor chain 10 is composed of a plurality of chain links 11 that are cardanically connected to one another via joints, whereby an ability to traverse curves is ensured. Each of the chain links 11 has a flat support surface on its upper side for the placement of the pallet to be conveyed. With the respective underside of the support surface, the conveyor chain slides in a guide that is suitably formed in the support profile. The carrier rails are, normally, supported by means of support profiles 24 so that the conveying segments may be suitably adapted to localities, e.g., may be suspended and guided on a ceiling of a factory workshop or warehouse. Below the support surface adjoins a web-like base body that serves essentially to accommodate the joint parts at its forward and rear ends, as viewed in the direction of conveyance. Moreover, protrusions extending transversely to the conveying direction may be moulded on both sides of the base body, via which protrusions the conveyor chain 10 may be guided in the carrier rail. Such a conveyor chain is well known to the skilled person, and an example is disclosed in WO 2013/141807 A1 by the applicant, the content of which is herewith explicitly incorporated by way of reference.

Respective lateral guides 15 may be provided, at least in segments, along conveyor tracks 2, 3, which lateral guides 15 extend in parallel and at a constant, predetermined distance from the conveying elements 10. These serve as a guide of the pallet so that this cannot slip off the conveying elements 10 to the side, as is described in detail in the following using FIGS. 2 and 3. For guidance, a suitable positive fit of the lateral guides 15 with guidance means 60 of the pallet 5 may be formed, where the lateral guides 15 and the guidance means 60 are designed to correspond to one another, wherein a sufficient gap between both positive fit elements preferably exists to reduce friction forces.

In the exemplary embodiment according to FIG. 1, the lateral guides 15 are simply designed as a gap in the segments of the conveyor track that extend in straight lines, which gap is formed with constant width between vertical side wall segments of the track rails of the conveyor chain 10 and vertical side walls of support bars 20. Balls, rollers, or projections that are provided on the underside of the pallet may be guided with positive fit with a gap designed in such a manner, wherein the width of the balls, rollers, or projections serving as guide elements of the pallet is smaller than the width of the gap of the lateral guides 15. Naturally, the lateral guides 15 may also be alternatively designed as concave guide grooves. Alternatively, the lateral guides 15 may naturally also be designed as convex formations, e.g., as guide projections, that protrude vertically like bars and extend in parallel to the conveying elements 10, where the guide elements are realised on the underside of the pallet as convex formations formed to correspond thereto.

According to a preferred embodiment, however, such lateral guides are not provided in the segments of the conveyor track that extend in straight lines or are curved in arcs. Rather, as presented in detail in the following, the positive interaction of guidance means on the underside of the pallet directly with lateral edges of the conveyor track 2 itself prevents a lateral slippage of the pallet from the conveyor track. The guidance means on the underside of the pallet may positively encompass or clasp the lateral edges of the conveyor track 2, upon transport of the pallet, in the segments of the conveyor track that extend in straight lines or curve in arcs. These lateral edges preferably correspond to vertical edge surfaces of a continuous profile in which the driven conveying element is guided, wherein the continuous profile simultaneously serves as a support of the driven conveying element. One example of such a continuous profile is the carrier rail of a chain conveyor that is disclosed, with reference character 3, in the figures of DE 102 36 559 A1 by the applicant, the content of which is herewith explicitly incorporated by reference.

Figure 2:
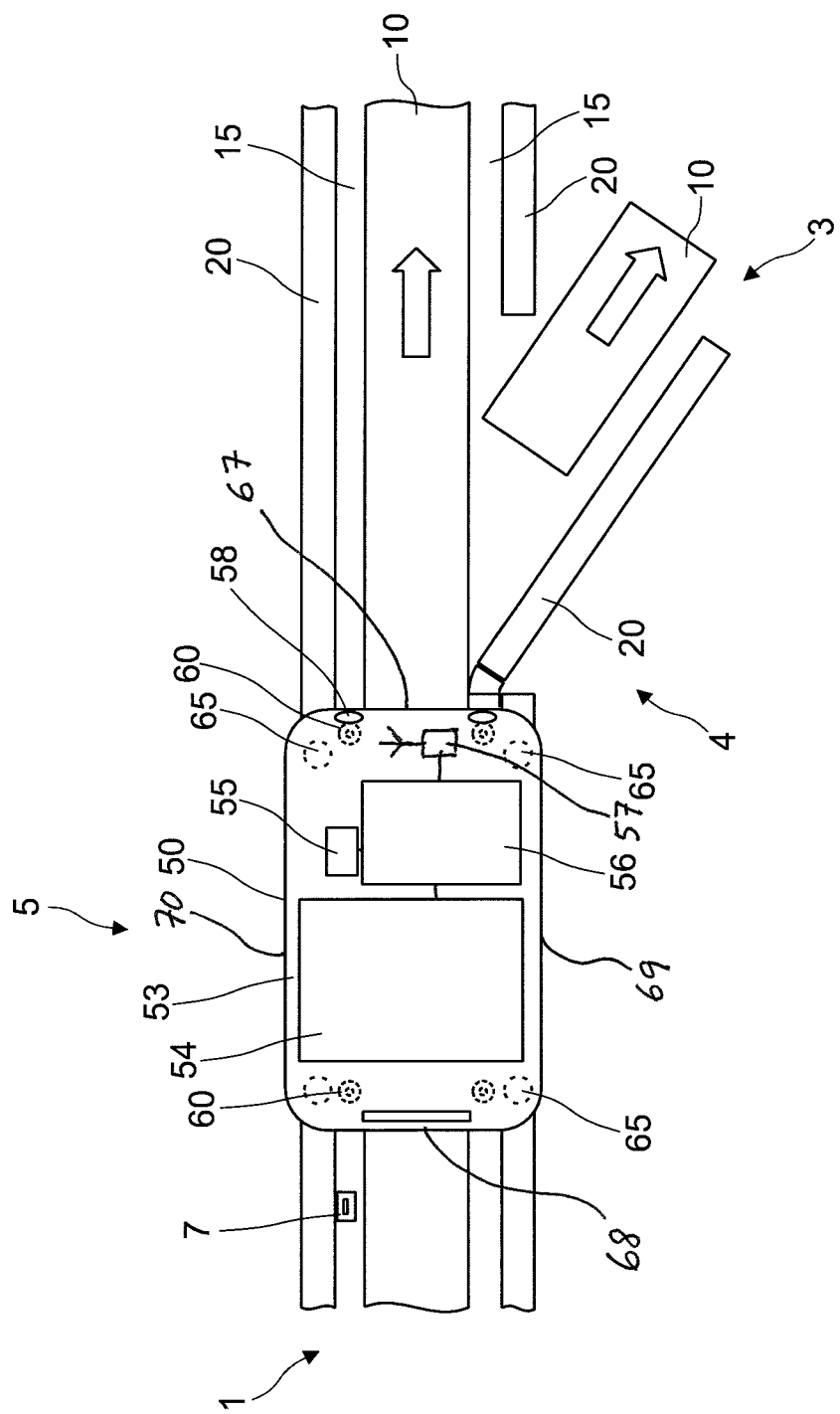
FIG. 2 shows in a schematic plan view a pallet according to the invention for use in a conveyor system.
Figure 3D:
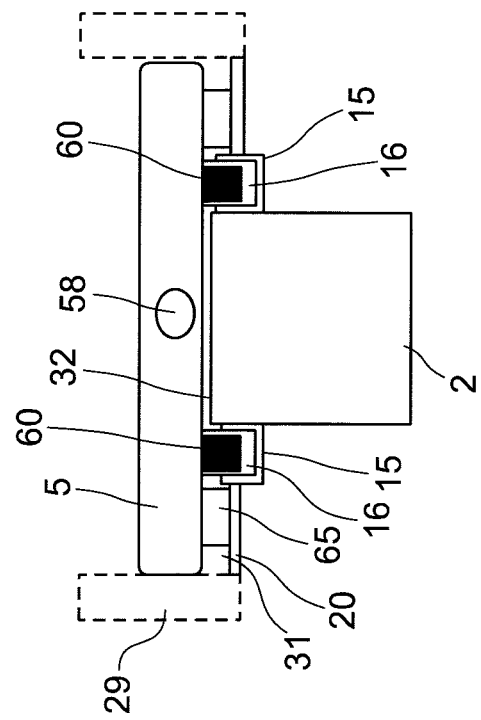

As can be seen in FIG. 2, the pallet 5 is designed to be wider than the respective conveyor track 2, 3, and may preferably cover the laterally arranged support surfaces 20 of the conveyor system 1, at least in segments. The support surfaces 20 preferably run flush with or slightly below the upper side of the conveying elements 10, so that a narrow gap 30 is formed between the underside of the pallet 5 and the upper side of the support surfaces 20 when the pallets 5 are conveyed passively by the conveying elements 10. Via suitable shaping of the underside of the pallet 5, the support surfaces 20 may naturally also be arranged to be higher than the lateral guides 15 and/or the conveying elements 10.

The support surfaces 20 are connected to the conveyor tracks 2, 3 by means of cross members 23. According to the invention, the support surfaces 20 serve to support the pallets 5 in a raised state if the underside 52 no longer rests upon the upper side of a conveying element 10, as is presented in detail in the following using FIGS. 3e and 6. However, the support surfaces 20 should, preferably, not serve as a lateral guidance of the pallet 5.

In a schematic plan view, FIG. 2 shows a pallet 5 according to the invention. The pallet 5 has a housing 50 that is typically box-shaped and forms a cavity 53 for receiving electronic and mechanical components. The upper side 51 of the housing 50 is preferably formed to be flat, so that material to be conveyed may simply be placed thereon. Moreover, active or passive function modules may also be installed on each pallet 5, e.g. belt conveyors transverse to the direction of motion, tilt trays, transport tubs, and the like, in order to load or unload the pallet with material to be conveyed or to suitably receive the material to be conveyed thereon.

The underside 52 of the pallet 5 is likewise formed to be flat, so that, for transport of the pallet 5 by the conveying element 10, the pallet may rest on the flat upper side of said conveying element 10, whereby a friction fit is formed. In other words, in the conveyor system, the pallets 5 are passively carried by the friction fit along with the conveying elements 10. According to the invention, the pallets 5 are provided with a sufficient intelligence and with control elements that enable an independent direction change of the pallets 5 in the region of a diverter section 4, as well as an independent stopping of the pallets 5 in the conveyor system, as described in the following.

For this, the pallet 5 initially possesses a suitable rechargeable power source, e.g. a rechargeable battery 54 for the electric power supply of a control unit, e.g. an electronic control unit comprising a CPU and a memory, and of additional electronic components, of electronic sensors, and of mechanical control elements.

Multiple guidance means 60 are provided on the underside of the pallet 5, which guidance means 60 positively interact with the lateral guides of the conveyor system and/or with the lateral edges of the conveyor tracks 2, e.g. with vertical edge surfaces of a support profile in which the driven conveying element is guided. The guidance means 60 are preferably formed as balls or rollers, and thus as convex formations whose profile corresponds to the concave profile of the lateral guides 15. In order to prevent a tilting of the pallet transverse to the conveying direction, see arrow in FIG. 2, a pair of guidance means 60 is respectively arranged at the pallet 5, at least at the front side 67 and rear side 68.

According to the invention, the guidance means 60 may be moved perpendicular to the underside of the pallet 5, and in fact between an extended state, in which the guidance means 60 engage to a sufficient extent in the lateral guides 15 of the conveyor system or positively interact with the lateral edges of the conveyor track for lateral guidance of the pallet 5, and a retracted state, in which the guidance means are retracted to a sufficient extent, so that these no longer engage in the lateral guides 15 of the conveyor system or no longer positively interact with the lateral edges of the conveyor track. According to the invention, this vertical displacement capability of the guidance means 60 enables direction changes of the pallet transverse to the conveying elements 10 in the diverter sections 4, as is described in detail in the following. In the retracted state, the guidance means 60 are completely retracted into the housing 50 of the pallet 5, and thus no longer project beyond the underside 52 of the housing 50.

More precisely stated, for a direction change, all guidance means 60 on the left side 70 or right side 69 of the pallet 5 may be vertically displaced together to the same extent, and in fact independently of one another on the right and left sides of the pallet 5. All guidance means 60 on the left or right side of the pallet 5, viewed in the conveying direction, may, preferably, be jointly vertically displaced synchronously with one another.

Additional details on the diverter sections 4 are described in the following using FIG. 1. According to FIG. 1, a branching piece 40 for diverting the pallet to the left is provided at the left side of the conveyor track 2, where a branching angle of approximately 45° is depicted, to which the invention should not be limited. The branching piece 40 initially has a flat upper side 41 that terminates flush with the adjoining support surfaces 20 so that, even in the region of the branching piece 40, a support and a stopping of the pallet may be realised, as is stated in detail in the following using FIGS. 3e and 6. Observed in the conveying direction, the lateral guide 15 is adjoined by a guide groove 42 (lateral guide) that preferably has the same profile as the lateral guides 15 and, in this exemplary embodiment, has a U-shaped profile and is laterally bounded by two vertical side walls 43. At the beginning of the branching piece 40, this guide groove 42 initially runs further in the direction of the arriving lateral guide 15, in order to enable a smooth, low-vibration sliding of the guidance means of the pallet into the branching piece 40. Adjoining this first segment of the guide groove 42, which first segment runs linearly, is a curved segment 44 that acts as a lateral guide and is responsible for the actual direction change of the pallet and, for this purpose, is preferably formed to be curved in an arc. In the region of the curved segment 44, the guide groove 43 also preferably has the same profile as the lateral guides 15. Adjoining the curved segment 44 is an additional linear segment of the guide groove 43 that extends in the same direction as the lateral guides 15 of the downstream conveyor track 3, in order to enable a smooth, low-vibration sliding of the guidance means of the pallet into the lateral guides 15 of the downstream conveyor track 3.

As is shown in FIG. 1, in the region of the branching piece 40, the guide groove 42 acting as a lateral guide is formed only on one side, here on the left side, providing a diversion to the left. The conveying element 10 of the conveyor track 3 begins at a certain distance from the conveying element 10 of the conveyor track 2. This distance is matched to the base of the pallet so that, during the diversion of the pallet in the other direction in the region of the branching piece 40, a sufficient support surface of the pallet on the conveying element of the conveyor track 2, 3 is ensured, in order to ensure a sufficient friction fit of the underside of the pallet with the respective conveying element 10, so that the pallet is conveyed further. The size of this placement surface also depends upon the respective friction pairing between the material of the conveying element 10 and the material on the underside of the pallet.

In the following, the principle of a direction change of a pallet according to the present invention is explained using FIGS. 3a through 3c. For this, it is first described using FIG. 3a how a pallet 5 is passively conveyed along a conveyor track 2 in segments of the transport path that extend in a straight line or curve in arcs. According to FIG. 3a, the underside 52 of the pallet 5 lies over a large area on the upper side of the conveying element of the conveyor track 2. The friction present in the region of the placement surface ensures a passive entrainment of the pallet. In this transport state, the guidance means 60 positively engage in the correspondingly-designed profile of the lateral guides 15, or the guidance means 60 directly interact with lateral edges of the conveyor track 2, e.g. a carrier rail, in which a conveyor chain or the like is guided, so that the pallet 5 is conveyed on the conveying element without lateral slippage. More precisely stated, in this exemplary embodiment, the profile of the lateral guides 15 is bounded by vertical guide legs 17, 18 which guide the guidance means 60. To reduce friction forces, a gap may be formed between the floor of the lateral guides 15 and the guidance means 60. In any event, the guidance means 60 extend to a sufficient extent into the profile of the lateral guides 15, in order to reliably ensure a lateral guidance of the pallet. In this state, to avoid unnecessary friction forces, a gap 30 exists between the lateral segments of the pallet 5 and the upper side of the support surfaces 20, as well as the upper side of the lateral guides 15. The additional lateral guides 29 depicted in FIG. 3a are not required according to the invention, and therefore are shown in dashed lines, but in principle may be provided in segments as an additional safety measure, e.g., in the regions of the branching pieces or segments of the conveyor system that are especially at risk of jamming, in order to prevent pallets from falling down from conveyor tracks.

In order to allow for a direction change of the pallet 5 to the left in the diverter section 4, all guidance means 60 on the right side 69 of the pallet 5 are sufficiently raised as viewed in the conveying direction, so that their engagement in the lateral guide 15 or in the lateral edge of the conveyor track 2 on the right side of the pallet 5 ceases to exist. Since the guidance means 60 on the left side of the pallet 5 as viewed in the conveying direction continue to engage in the guide profile of the lateral guide 15 or in the lateral edge of the conveyor track 2 on the left side of the pallet 5, the pallet 5 follows the curve of the guide profile of the lateral guide 15 on the left side of the pallet 5 during the further conveying by the conveying element, until the underside of the pallet finally rests on the conveying element of the left conveyor track 3.

The pallet 5 is subsequently conveyed further in the new direction by the left conveyor track 3. After leaving the diverter section 4, the guidance means 60 are once again extended on the right side of the pallet 5 as viewed in the conveying direction, so that the initial state according to FIG. 3a is once again assumed, in which the guidance means 60 positively engage in the correspondingly designed profile of the lateral guides 15, or the guidance means 60 directly interact with lateral edges of the conveyor track itself, e.g., with lateral edges of a support rail in which a driven conveyor chain is guided so that the pallet 5 is conveyed on the conveying element 10 without slipping sideways.

In the diverter section 4, the underside of the pallet 5 thus slides transversely across the conveying element 10 of the conveyor track 2, which may require that the guidance means 60 preferably do not protrude from the underside of the pallet 5 on the right side of the pallet 5 as viewed in the conveying direction.

Figure 3C:
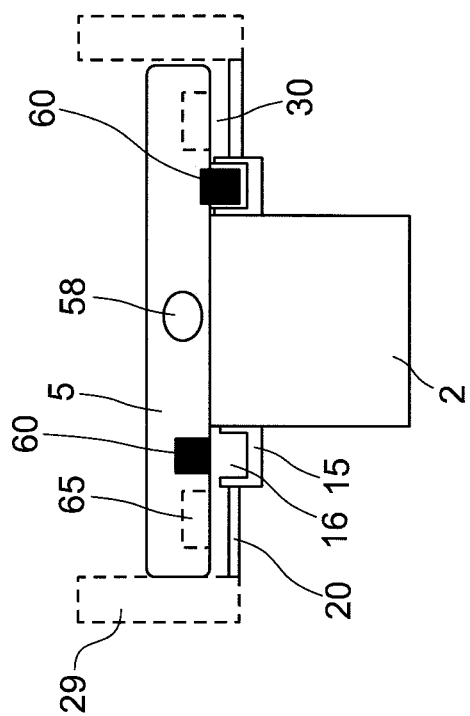

FIG. 3c mirror-symmetrically shows the state of the pallet 5 when it is to be redirected to the right at a diverter section 4. To this end, all guidance means 60 are sufficiently raised on the left side of the pallet 5 as viewed in the conveying direction, so that their engagement in the lateral guide 15 or in the lateral edge of the conveyor track 2 on the left side of the pallet 5 ceases to exist. Since the guidance means 60 on the right side of the pallet 5 as viewed in the conveying direction continue to engage in the guide profile of the lateral guide 15 or in the lateral edge of the conveyor track 2 on the right side of the pallet 5, the pallet 5 follows the course of the guide profile of the lateral guide 15 on the right side of the pallet 5 during the further conveying by the conveying means, until the underside of the pallet finally rests on the conveying element of a conveyor track arranged on the right side of conveyor track 2, and the pallet 5 is guided further in the new direction by the lateral guides 15 of this downstream conveyor track or by the engagement with the lateral edges of the conveyor track there.

When leaving the branching piece 40, the guidance means 60 on the left side of the pallet 5 as viewed in the conveying direction are once again extended, so that said guidance means once again engage with the guide profile of the lateral guide 15 on the left side of the conveying element of the downstream conveyor track or directly interact with both lateral edges of the conveyor track in order to laterally guide the pallet 5.

By selectively adjusting the guidance means 60 on the left or right side of the pallet 5, said pallet can thus be redirected into a different direction gently, and with low vibrations. By suitably arranging branching pieces and suitably selecting the course of the pallets, which are preferably designed to be able to negotiate curves, a conveyor system that can be adapted individually to the available space of the user can thus be assembled according to the invention. The intelligence for controlling the transport paths of the pallets in such a conveyor system can be completely integrated according to the invention into the control unit of the pallets, as explained below. It is also possible to control the pallets by a central control unit of the conveyor system or a mixed control, partially by the control unit of the pallet and partially by a central control unit of the conveyor system.

According to another aspect of the present invention, the pallets can also react to situations of congestion and other dangerous situations, by stopping the pallet in the conveyor system at any point in the conveyor system. According to FIG. 3a, laterally to the guidance means 60 and above the assigned lateral support bars 20, are adjustable lifting devices 65 arranged, e.g. in the form of vertically extendable lifting cylinders, or even swivelling friction elements, which can raise the pallets vertically by supporting them on the upper side of the support bars 20 so far that the underside 52 of a pallet 5 no longer rests on the upper side of the conveyor track 2, such that the pallet 5 is no longer conveyed by said conveyor track. As can be seen in FIG. 2, the lifting devices 65 are arranged to at least be close to the front side 67 and rear side 68 of the pallet 5, in order to allow for even lifting without tilting. As indicated by the two outer double arrows in FIG. 3e, all lifting devices 65 of a pallet 5 can be extended synchronously, jointly with each other. In the extended state of the lifting devices 65 according to FIG. 3d, the free front ends of the lifting devices 65 rest on the upper sides of the lateral support bars 20, so that a gap 32 is formed between the upper side of the conveyor track 2 and the underside 52 of the pallet 5, such that the pallet 5 is no longer further conveyed. The frictional forces acting in the region of the free front ends of the lifting devices 65 on the upper side of the support bars 20 are sufficient to allow immediate stopping of the pallet 5.

In order to allow an even more controlled stopping of the pallets 5 at predefined positions in the conveyor system, recesses 22 can additionally be formed at the predefined positions of the lateral support bars 20, as shown in FIG. 3e, in which recesses the front ends of the lifting devices 65 can engage in the extended state. The two double arrows in FIG. 3e once again summarise the possibilities of adjustment in a pallet 5 according to the present invention.

In order to prevent contaminations from entering the housing of the pallet 5, recesses 66 for receiving the lifting devices 65 and recesses 61 for receiving the guidance means 60 can be provided on the underside of said pallet. In order for the pallet 5 to continue to be aligned in the raised position with the lateral guides 15, and for the guidance means 60 to once again be reliably guided in the lateral guides after retraction of the lifting devices 65, the adjustable stroke of the lifting devices, i.e., the maximum adjustment travel between the retracted position and the completely extended position, is preferably smaller than the extension depth of the guidance means 60 in the guide profiles of the lateral guides 15.

As can further be seen in FIGS. 2 and 3e, at least one distance sensor 58 for detecting obstructions in a region in front of the pallet 5 is provided on the front side 67 of the pallet 5. This distance sensor 58 can be designed as an ultrasonic sensor, optical sensor, or another sensor functioning without contact, such as an HF sensor. The signals of the distance sensor 58 are directly evaluated by the control unit 56 of the pallet 5. In the case where an obstruction is detected in front of the pallet 5, the control unit 56 emits a warning signal, which triggers an extension of the lifting devices 65, as described in more detail below with reference to FIG. 6. An appropriate distance sensor can also check the space behind the pallet 5 for obstructions or situations of congestion.

In order to detect the position of the pallet 5 in the conveyor system, the pallet 5 furthermore has a detection device for detecting position indicating markings or position data. Position indicating markings 7 can, moreover, be arranged in the conveyor system at predefined positions, based upon which position indicating markings the pallet can autonomously determine its current position in the conveyor system. These position indicating markings 7 can, for example, be arranged at a suitable position in the lateral guides 15, but can also be provided at any other point.

The position indicating markings 7 can, in particular be simple bar code markings that are, for example, read optically by a sensor of the pallet 5. In the shown example, position indicating markings are preferably RFID labels, which are read by means of an RFID reading device 55 arranged in the pallet. The position of the pallet can basically also be detected by means of radio signals, e.g., by means of WIFI interfaces. In any case, the pallet can autonomously determine its position in the conveyor system, wherein the control unit 56 of the pallet 5 can also transmit this position and marking information to a central control unit of the conveyor system, e.g. by means of a WLAN interface. Based upon the position and position indicating marking information detected in this way, the control unit 56 of the pallet and/or the central control unit of the conveyor system can then carry out another control of the transport state of the pallet in the conveyor system, which may include an adjustment of the control elements of the guidance means 60 and the lifting devices 65 in order to change the conveying direction of the pallets 5 and/or to stop the pallets or to have them conveyed again.

Figure 4:
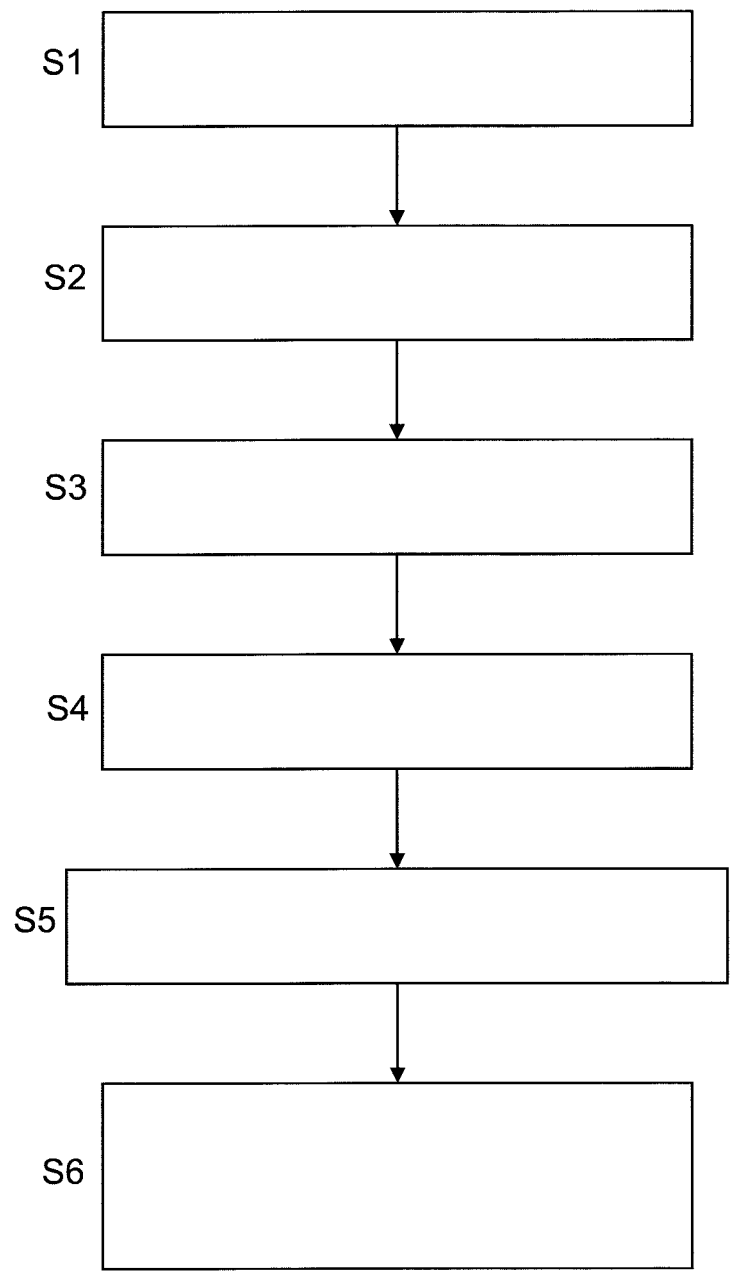
FIG. 4 shows a schematic flow diagram of a method for controlling the conveyor system and a pallet according to the invention.

FIG. 4 summarises, in general, the steps for controlling the conveyor system. First, data on the topography of the conveyor system is provided in a first step S1. These data include information on all conveyor tracks in the conveyor system, on the respective conveying velocity of the conveyor tracks in the conveyor system, on the position, length, and conveying direction of all diverter sections of the conveyor system, on the exact position of engagement recesses 22 in the lateral support bars 20 and, where applicable, on regions that are potentially at risk of congestions or dangerous regions in the conveyor system. This information can be stored in a memory of the central control unit of the conveyor system, but is preferably stored in a memory of each control unit 56 of each pallet 5. These data on the topography of the conveyor system can be updated periodically and transmitted to all pallets 5, e.g. by means of WLAN interfaces and stored there. The data on the topography of the conveyor system are used to calculate transport paths for the pallets in the conveyor system.

Furthermore, position indicating marking or position data for the pallets in the conveyor system are provided in step S2, so that, based upon these data, the current positions of all pallets in the conveyor system can be determined by the control units 56 of the pallets and/or by the central control unit of the conveyor system.

In step S3, data on the respective destination point of a pallet are provided for each pallet. Based upon the current position, upon the starting point of a pallet, where applicable, and upon the data on the topography of the conveyor system, a transport path for each pallet in the conveyor system can then be calculated in step S4. The calculation preferably is done such that the length of the respective transport paths is minimised, in order to allow for optimum throughput of the conveyor system. The transport paths are, preferably, respectively calculated in the control units 56 of the pallets, but can basically also be calculated and adapted to each other in the central control unit of the conveyor system, or in both in combination.

In accordance with the transport paths calculated in this way and with the data on the topography of the conveyor system, suitable sequences of adjustment movements of the guidance means of the pallets in the conveyor system are then calculated in step S5, i.e. of the control elements for adjusting the guidance means and the lifting devices, so that the pallets in the conveyor system carry out a suitable sequence of direction changes and stops in order to be conveyed through the conveyor system according to the respectively calculated transport path.

In doing so, it can basically be provided that each pallet in the conveyor system transmit feedback to the central control unit of the conveyor system and/or to all other pallets in the conveyor system, e.g. by means of WIFI interfaces, regarding the current position of the pallets in the conveyor system, regarding current congestions, or other dangerous situations in the conveyor system. As described below in more detail with reference to FIG. 7, alternative transport paths, which circumvent current congestions or other hazardous situations in the conveyor system, can be calculated by the control units of the pallets and/or by the central control unit of the conveyor system on the basis of this feedback, whereby the throughput in the conveyor system can be increased further. According to the invention, the intelligence required for this purpose can also be integrated exclusively into the pallets in the conveyor system. The pallets can thus be considered as virtually autonomously-working, intelligent transport vehicles for the quick, carefully-targeted transport of material to be conveyed from a starting point to a pre-specified destination point. A central control system of the conveyor system is basically not required for this purpose.

Figure 5:
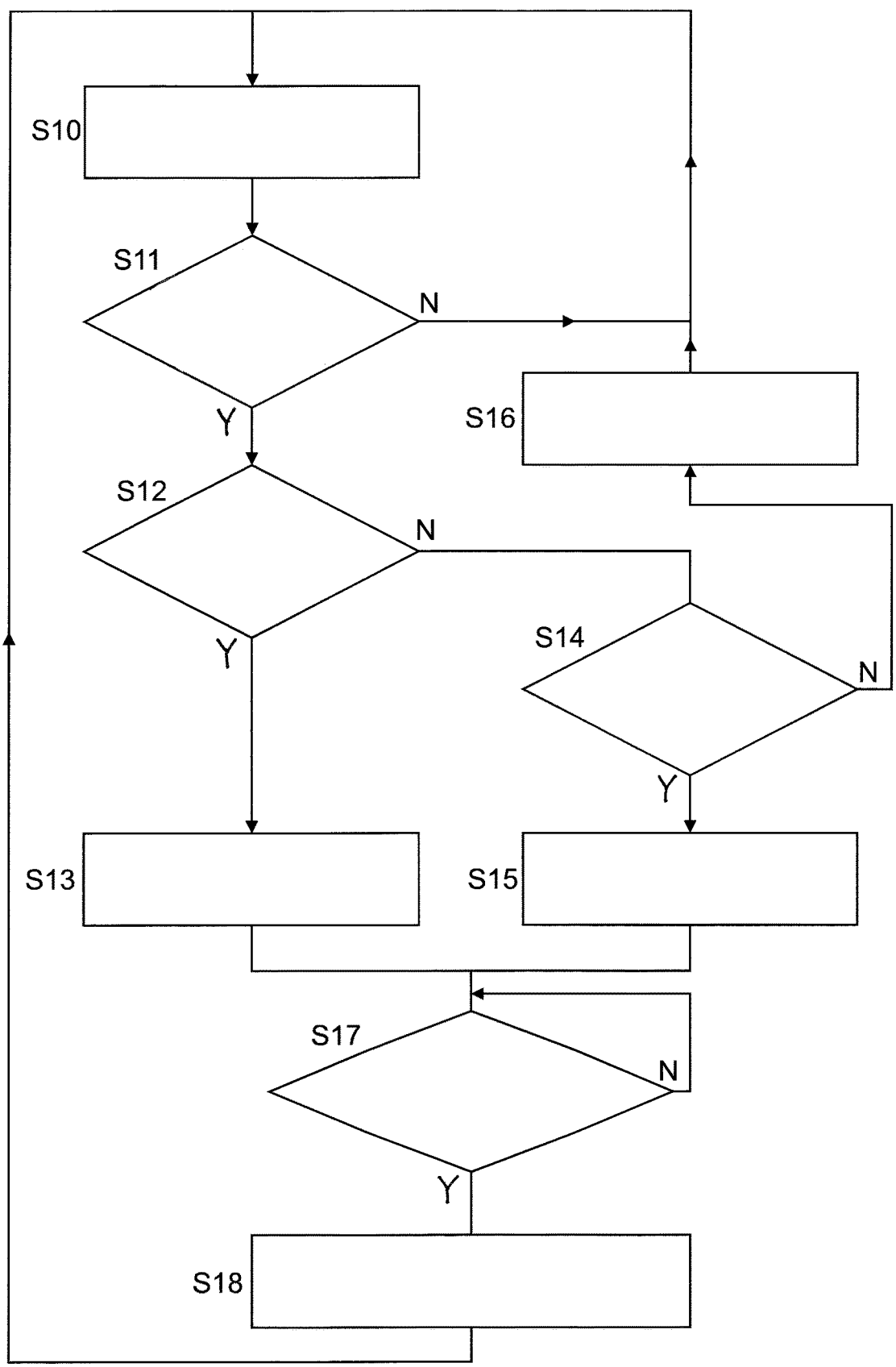
FIG. 5 shows a schematic flow diagram of a method for controlling a pallet according to the invention in a diverter region in the conveyor system according to the invention.

FIG. 5 summarises the method steps carried out by a pallet in the region of a branching point. In this case, it is assumed that the guidance means take the state according to FIG. 3a on the underside of the pallet in the region in front or upstream of a branching point and the state according to FIG. 3b or 3c in the region of a branching point as described above.

For this purpose, information on the current position of the pallet is needed first, which can also take place, with knowledge of the conveying velocities, by simple time control, but preferably takes place on the basis of markings or position information detected autonomously by the pallet, e.g. by reading a position indicating marking in step S10, which position indicating marking is arranged at a predefined position upstream of a branching piece and based upon which position indicating marking the pallet, knowing the conveying velocity and topography of the conveyor system, can autonomously calculate at which point in time the guidance means of the pallet must be adjusted in order to bring about a direction change of the pallet in accordance with the calculated transport path.

To this end, it is first determined in step S11 whether the position indicating marking and position information read is assigned information on a branching point, i.e., whether the transport path respectively calculated for the pallet requires a direction change downstream of the currently read position indicating marking or position. If this is not the case (N), the procedure returns to step S10; otherwise (Y), a query takes place in step S12 as to whether the transport path requires a direction change to the left, and the topography of the conveyor system at the currently-read position indicating marking or position provides for a branching piece with direction change to the left. If this is the case (Y), the guidance means on the right side of the pallet are subsequently retracted, which corresponds to the state according to FIG. 3b and allows for a direction change to the left. After the query step S12, the procedure otherwise (N) goes to step S14, in which a query takes place as to whether the transport path requires a direction change to the right, and the topography of the conveyor system at the currently-read position indicating marking or position provides for a branching piece with direction change to the right. If this is the case (Y), the guidance means on the left side of the pallet are subsequently retracted, which corresponds to the state according to FIG. 3c and allows for a direction change to the right. If this is not the case (N), a safety procedure in step S16 can additionally be carried out, which is for preventing uncontrolled or undefined movement states of a pallet. The procedure subsequently returns to step S10.

After the right or left guidance means are retracted in steps S13 or S15, a query takes place in step S17 as to whether the region of the branching piece was left. With knowledge of the current conveying velocity in the region of the branching piece, this can be determined exclusively on the basis of a timer, but is preferably carried out by reading another piece of position indicating marking or position information, similarly to step S10. To this end, a marking that is comparable to position indicating marking 7 and which is read optically or by means of the RFID reading device 55 of the pallet, can also be provided at the end of the branching piece. If it is determined in step S17 that the region of the branching piece was left, the procedure subsequently extends the previously retracted guidance means again in step S18, so that the normal transport state of the pallet is subsequently assumed, as shown in FIG. 3a. The procedure subsequently returns to step S10. If it is, on the other hand, determined in step S17 that the region of the branching piece was not left, the procedure returns to step S17.

In this way, a sequence of adjustment movements of the guidance means of the pallet is carried out at each branching piece in the respective transport path of a pallet, in order to bring about a suitable sequence of direction changes of the pallet in the conveyor system so that the pallet can navigate through the conveyor system in accordance with its individually calculated transport path. This sequence of adjustment movements of the guidance means can be calculated and controlled according to the invention by the pallet itself by means of its control unit 56, but can basically also be calculated and controlled by the central control unit of the conveyor system, or by both the control unit 56 and the central control unit of the conveyor system.

Figure 6:
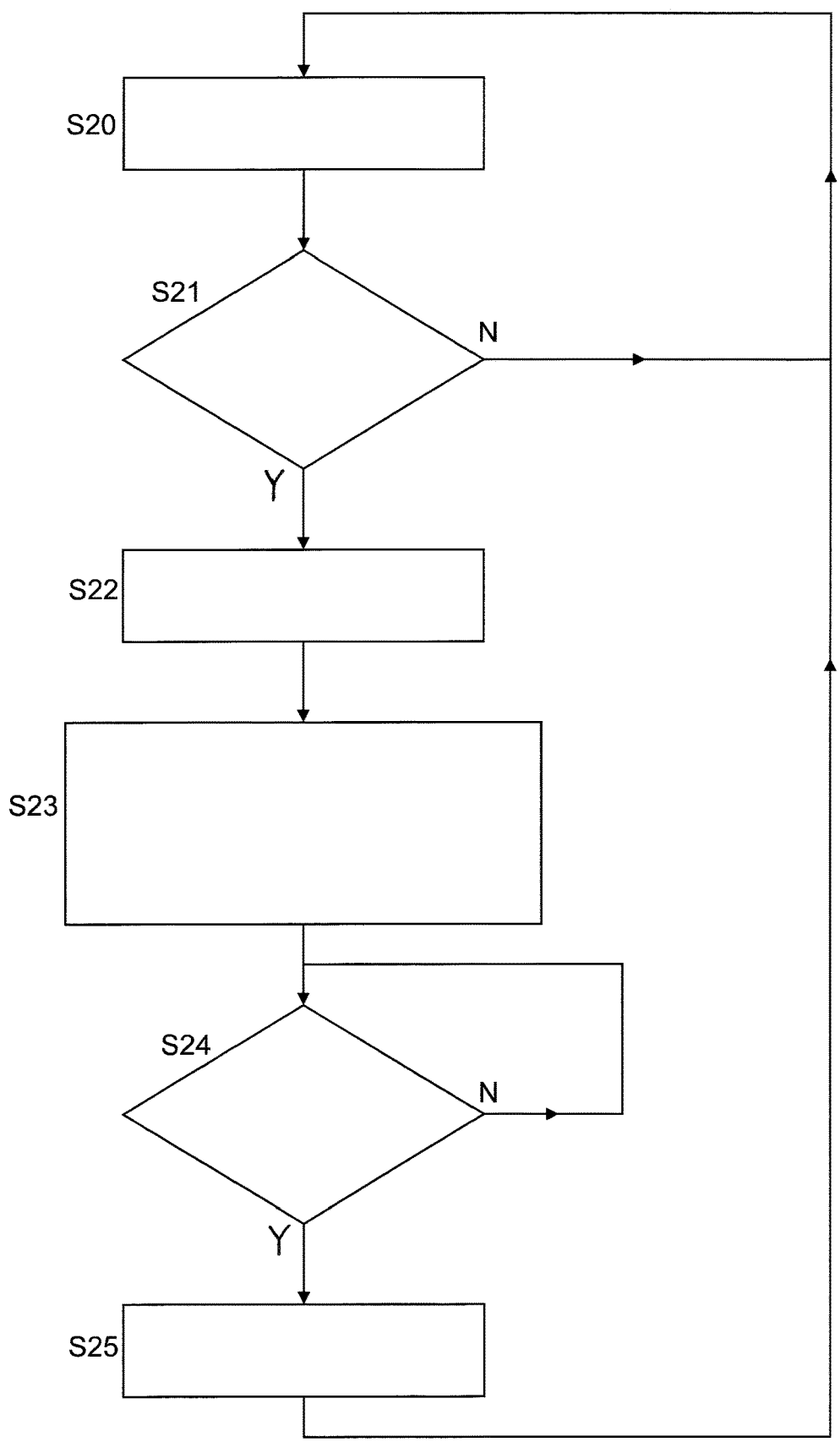
FIG. 6 shows a schematic flow diagram of a method for controlling a pallet according to the invention in the event of a jam or a detected obstacle in the transport system according to the invention.

FIG. 6 summarises the method steps carried out by a pallet for avoiding situations of congestion in the conveyor system. For this purpose, detection of information on congestions in the conveyor system is first required. This congestion information can basically be detected by the central control unit of the conveyor system checking all sections of the conveyor system, which would, however, be comparatively elaborate. The pallets are therefore equipped according to the invention with sufficient intelligence to detect and analyse congestion information in the conveyor system. Serving this purpose is the distance sensor 58, which was described above with reference to FIGS. 2 and 3e and which continuously checks the region in front of a respective pallet in the conveyor system, and determines in step S20, the distance to objects or obstructions located in front of the pallet. The signal of the distance sensor 58 is continuously evaluated by the control unit 56 of the pallet and checked for falling below a pre-specified threshold value in step S21.

If it is determined in step S21 that the pre-specified threshold value was fallen below (Y), the procedure goes to step S22 and subsequently extends the lifting devices of the pallet in step S22 in accordance with a defined routine, which corresponds to the state according to FIG. 3e and results in stopping the pallet. The information on this changed transport state of the pallet according to congestion information in the conveyor system can subsequently be transmitted in step S23, together with current position data of the pallet, to the central control unit of the conveyor system and/or the control units of other pallets in the conveyor system, e.g., in order to forewarn them of the situation of congestion.

The procedure subsequently goes to step S24, in which the control unit of the pallet determines on the basis of the current signal of the distance sensor whether the pre-specified threshold value has been exceeded again. If this is not the case (N), the procedure returns to step S24, i.e. the pallet continues to be stopped. Otherwise (Y), the procedure goes to step S25 and retracts the lifting devices of the pallet again, which corresponds to the normal transport state of the pallet according to FIG. 3a. Since the underside 52 of the pallet 5 once again rests on the upper side of the conveyor track 2 in this state, the pallet is subsequently conveyed further by the conveyor track 2. The procedure subsequently returns to step S20.

In this way, each section of a respective transport path of a pallet is checked for obstructions and, if an obstruction is detected, a sequence of adjustment movements of the lifting devices of the pallet is carried out in order to bring about a suitable sequence of height changes in the pallet in the conveyor system, so that the pallet can navigate through the conveyor system in accordance with its individually calculated transport path. This sequence of adjustment movements of the lifting devices can be calculated and controlled according to the invention by the pallet itself by means of its control unit 56, but can basically also be calculated and controlled by the central control unit of the conveyor system, or by both the control unit 56 and the central control unit of the conveyor system.

Figure 7:
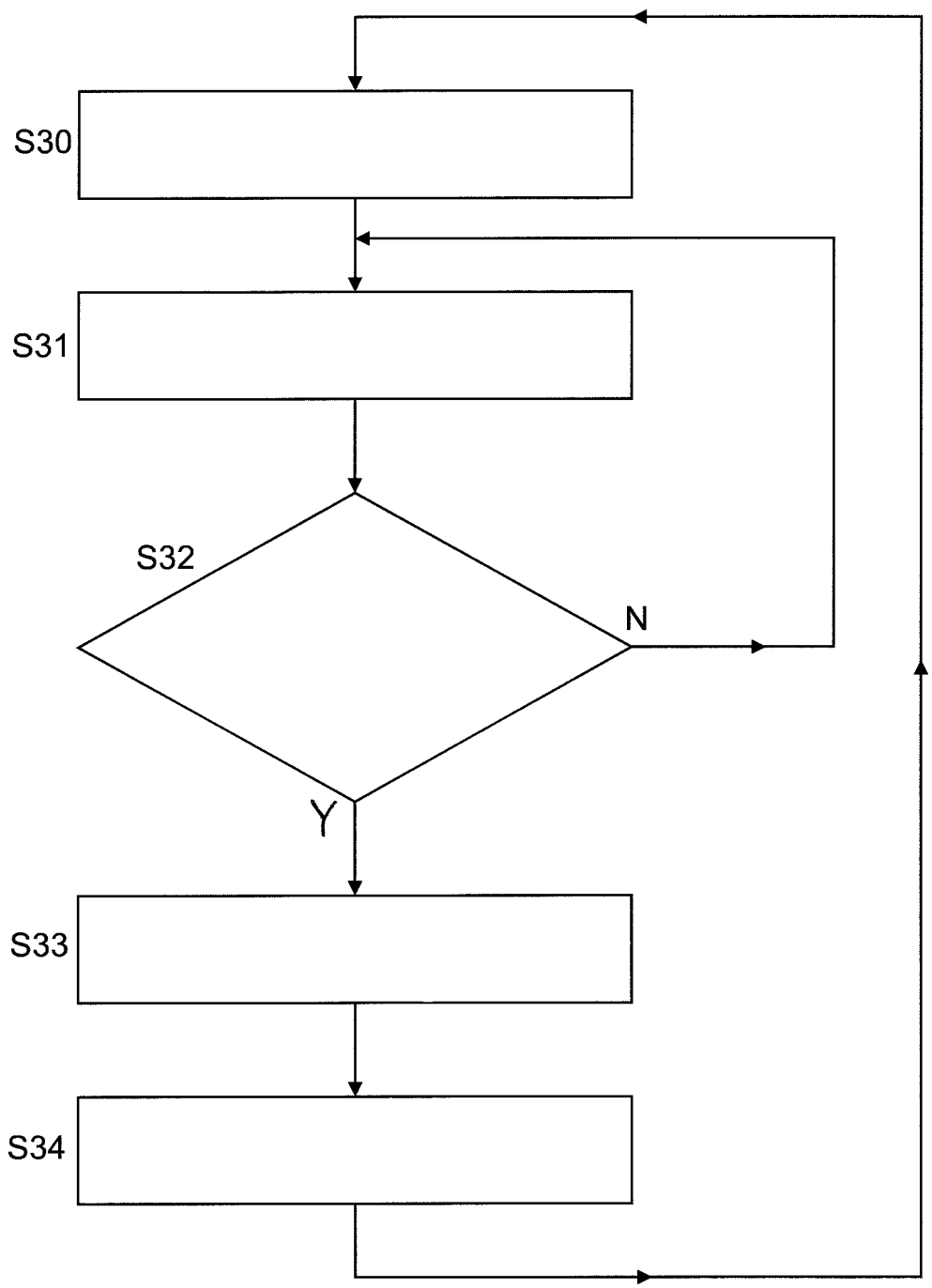
FIG. 7 shows a schematic flow diagram of an additional method for controlling a pallet in the transport system according to the invention.

FIG. 7 summarises the method steps carried out by a pallet for calculating an alternative transport path for transporting material from a starting point to a destination point, where the alternative transport path will circumnavigate the jam or otherwise hazardous segments in the conveyor system, whereby damage to the pallet, and also to the material to be conveyed, may be reliably avoided.

In step S30, based e.g. on the current position, on the starting point of a pallet, and on the data on the topography of the conveyor system, a transport path for a pallet in the conveyor system is calculated by the control unit of the pallet. This step resembles step S4 for a single pallet. In step S31, information regarding jam or congestion in the conveyor system is evaluated. This information may be sent from a central control unit of the conveyor system or from other pallets in the conveyor system. In step S32, the control unit of the pallet determines if an alternative transport path is needed or not in order to reach the destination point. If no alternative transport path is needed (N), the procedure returns to step S31. If it is determined in step S32 that an alternative transport path is needed (Y), an alternative transport path is calculated in step S33.

In step S34, a suitable sequences of adjustment movements of the guidance means of the pallet is calculated. In this way, the pallet can carry out a suitable sequence of direction changes and stops in order to be conveyed through the conveyor system to the pre-defined destination point. This step resembles step S5 for a single pallet.

The invention is not to be regarded as being limited to the embodiments described above, a number of additional variants and modifications being possible within the scope of the subsequent patent claims. The pallet may e.g. have any size and may be made from any suitable material.

REFERENCE SIGNS

1: Conveyor system
2: Conveyor track
3: Conveyor track
4: Diverter section
5: Pallet
7: Position indicating marking
10: Conveying element
11: Chain link
12: Finger
13: Gap
15: Lateral guide
16: Guide groove
17: Vertical guide leg
18: Vertical guide leg
19: Side wall of guide rail
20: Support bar
21: Side wall of support bar
22: Recess in support bar
23: Cross member
24: Support profile
29: Lateral guide
30: Gap over support bar
31: Gap over support bar
32: Gap over conveyor chain
40: Branching piece
41: Upper side of branching piece
42: Guide groove
43: Side wall of guide groove
44: Curved section
50: Housing
51: Upper side
52: Underside
53: Cavity
54: Battery
55: RFID reading device
56: Control unit
57: Wireless communication device
58: Distance sensor
60: Guidance means
61: Receptacle for guidance means
65: Lifting device
66: Receptacle for lifting device
67: Front side
68: Rear side
69: Right side
70: Left side

The invention claimed is:

1. A pallet (5) for a conveyor system (1) comprising a conveyor track (2, 3), where the pallet (5) comprises a housing (50) having an upper side (51) adapted to support an object, and an underside (52) opposite to the upper side (51), where the underside is adapted to bear on a conveyor track (2, 3), where the housing (50) comprises a front side (67), a rear side (68), a right side (69) and a left side (70), characterized in that the pallet (5) comprises a rechargeable power source (54), a control unit (56), a wireless communication means (57) and a plurality of actuating means (60;

65) arranged to be controlled by the control unit (56), where the actuating means (60; 65) are adapted to extend out of the housing (50) or to retract into the housing (50) by a control signal from the control unit (56).

2. A pallet according to claim 1, characterized in that the actuating means (60; 65) comprises guidance means (60), where two guidance means (60) are arranged at the front side (67) of the housing (50) and two guidance means (60) are arranged at the rear side (68) of the housing (50).

3. A pallet according to claim 2, characterized in that the guidance means (60) arranged at the right side (69) of the housing (50) are adapted to be controlled at the same time by the control unit (56) and that the guidance means (60) arranged at the left side (70) of the housing (50) are adapted to be controlled at the same time by the control unit (56).

4. A pallet according to claim 1, characterized in that the actuating means (60; 65) comprises lifting devices (65), where two lifting devices (65) are arranged at the front side (67) of the housing (50) and two lifting devices (65) are arranged at the rear side (68) of the housing (50).

5. A pallet according to claim 4, characterized in that the lifting devices (65) are arranged between the guidance means (60) and the right side (69) respectively left side (70), and that the lifting devices (65) are adapted to be controlled at the same time by the control unit (56).

6. A pallet according to claim 4 characterized in that the guidance means (60) are arranged to extend further out of the housing (50) than the lifting devices (65).

7. A pallet according to claim 1, characterized in that the pallet (5) further comprises a distance sensor (58) adapted to detect a distance to an object in front of the pallet (5).

8. A pallet according to claim 1, characterized in that the pallet (5) further comprises a detection means (55) adapted to detect a position indicating marking (7) of the conveyor system (1).

9. A method for transporting material to be conveyed from a starting point to a destination point by means of pallets in a conveyor system having a plurality of conveyor tracks for conveying the pallets, where the conveyor system comprises lateral guides arranged along opposite sides of a conveyor track, wherein the pallets are designed according to claim 1, comprising the following steps:

providing information on the topography of the conveyor system to a control unit of a pallet;

providing marking or position data for the pallets in the conveyor system, wherein a respective transport path for transporting material to be conveyed from the respective starting point to the respective destination point is calculated for the pallets as a function of the topography of the conveyor system and/or an operating load of the conveyor system, the calculation of the respective transport path is respectively performed by the pallets, or the calculation of the respective transport path is performed by a central control unit of the conveyor system, and the calculated transport paths are transmitted to the respective pallets, and the guidance means and/or lifting devices of the pallets are adjusted in a time-dependent manner according to the respectively calculated transport path.

10. A method according to claim 9, wherein a pallet is provided with a distance sensor for detecting obstructions in the conveyor system in front of the pallet, wherein the distance to a detected obstruction is determined on the basis of an output signal of the distance sensor, and where the lifting devices of a pallet are jointly actuated when the distance determined in this way falls below a pre-specified threshold value.

11. A method according to claim 9, wherein position indicating markings for pallets are detected in the conveyor system, wherein positions of the pallets in the conveyor system are determined on the basis of the detected position indicating markings, and the guidance means arranged on a right side of a respective pallet or the guidance means arranged on an opposite left side of the respective pallet are selectively, jointly adjusted as a function of the position determined in this way and in accordance with the respectively calculated transport path, in order to selectively bring the guidance means into and out of engagement with the lateral guide on the right or left side of the conveyor track in order to change the direction of movement of the respective pallet.

12. A method according to claim 9, in which data are exchanged with a central control unit of the conveyor system or with control units of other pallets that are conveyed in the conveyor system, wherein the guidance means and/or lifting devices of the pallets continue to be adjusted in a time-dependent manner as a function of the data exchanged.

13. A method according to claim 9, in which, in the case of congestion in the conveyor system, an alternative transport path for transporting material to be conveyed from a starting point to a destination point is calculated for a pallet affected by the congestion.

14. A computer program comprising program code means for performing all the steps of claim 9 when said program is run on a computer.

15. A computer program product comprising program code means stored on a computer readable medium for performing all the steps of claim 9 when said program product is run on a computer.

* * * * *